July 13, 1954  W. H. DODGE  2,683,399
TOOL FOR AND METHOD OF CHAMFERING GEAR
TEETH AND METHOD OF FORMING SUCH TOOL
Filed Nov. 5, 1949  2 Sheets-Sheet 2
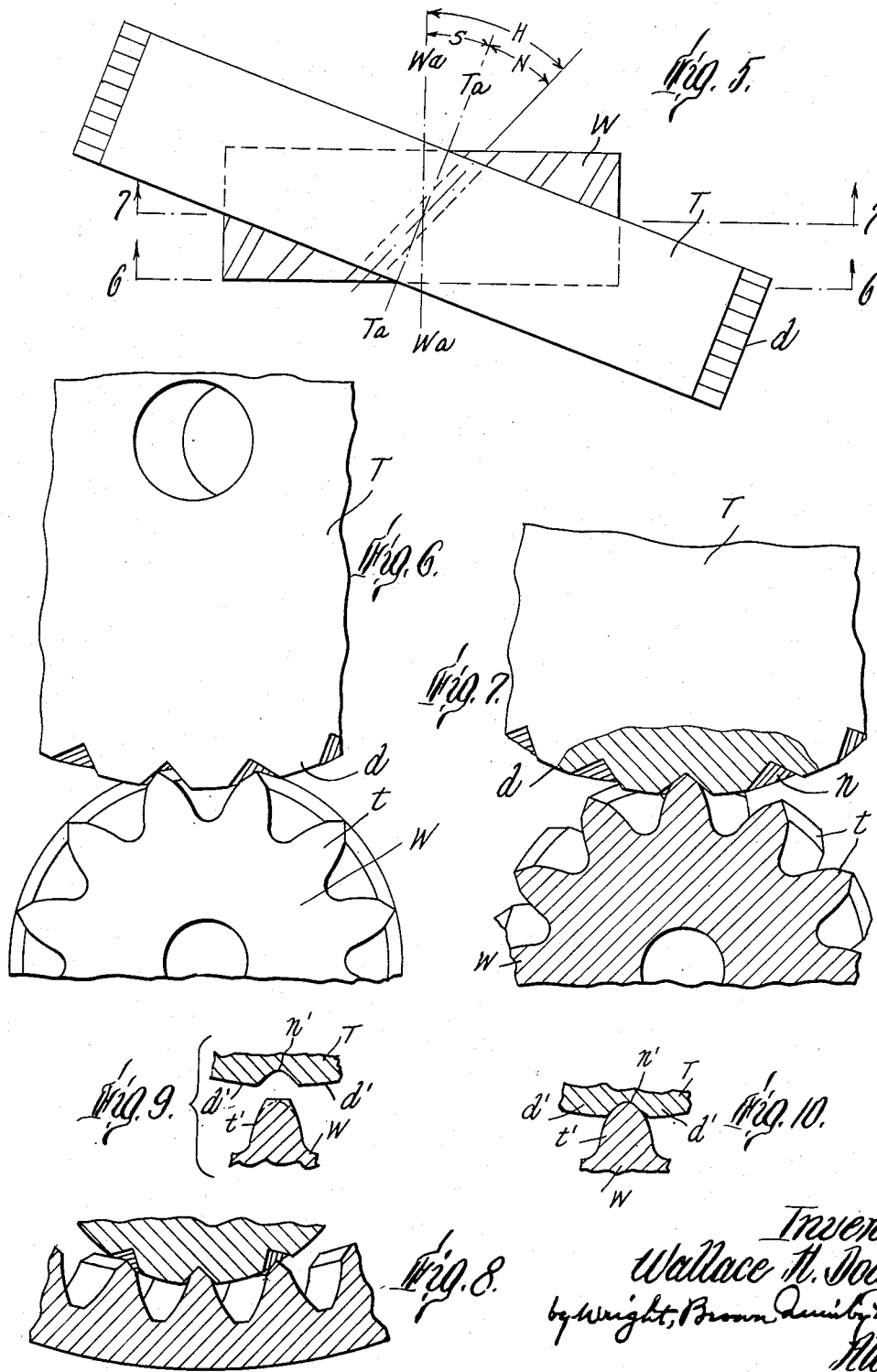

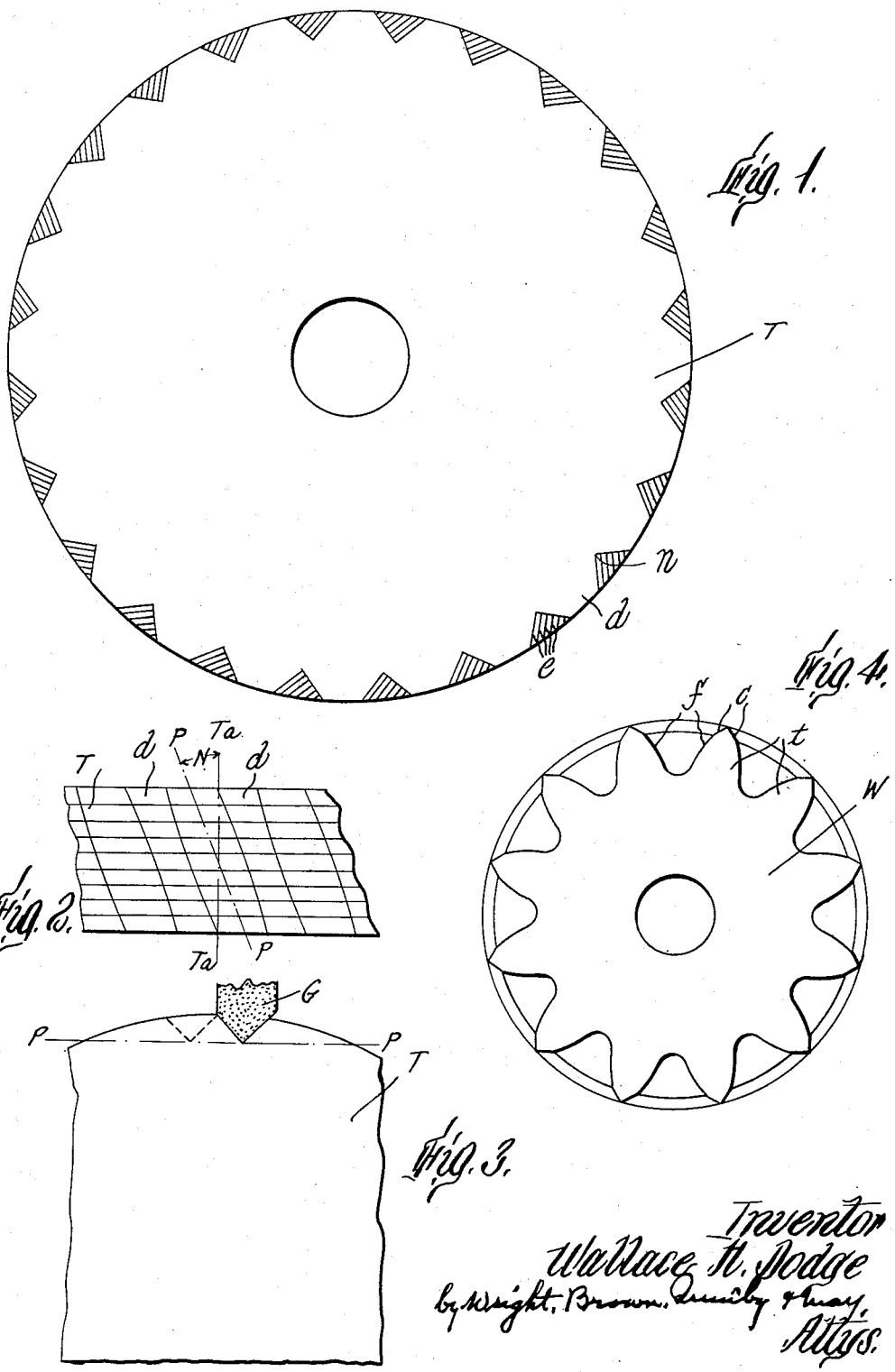

Patented July 13, 1954

2,683,399

UNITED STATES PATENT OFFICE 2,683,399

TOOL FOR AND METHOD OF CHAMFERING GEAR TEETH AND METHOD OF FORMING SUCH TOOL

Wallace H. Dodge, Springfield, Vt., assignor to The Fellows Gear Shaper Company, Springfield, Vt., a corporation of Vermont Application November 5, 1949, Serial No. 125,823

6 Claims. (Cl. 90—1.4)

The purpose of the present invention is to chamfer outwardly projecting parts of machine elements, such as the teeth of gears and racks, splines, and the helical ribs of worms; all comprehensively included within and designated by the expression "gear teeth and the like." The character of chamfering here contemplated is the cutting away of the corners between the side and outer faces of such teeth and the like with beveled or rounded contours and, in some instances, rounding of the outer faces as well. An important object in this connection is to enable such chamfering or trimming to be effected very rapidly and without necessitating relative axial movement between the work piece being chamfered and the tool by which the cutting effect is performed. The invention comprises a novel chamfering tool, a novel method of chamfering gear teeth and the like with the use of such a tool and a novel method of forming that part of the chamfering tool which performs the cutting action on work pieces.

In the following specification and accompanying drawings, there are shown and described one form of chamfering tool embodying this invention, the procedure of chamfering the outer ends of gear teeth with the use of such a tool, and the method of forming the operative elements of such a tool.

In the drawings,

Fig. 1 is an end elevation of the specific tool referred to;

Fig. 2 is a fragmentary top view of such tool showing two adjacent teeth thereof;

Fig. 3 is a diagrammatic view illustrating the method of forming the teeth and interdental spaces of the tool;

Fig. 4 is a side view of a gear which has been chamfered by the cutting action of the tool;

Fig. 5 is a side view of the chamfering tool in mesh with a work gear in the process of chamfering the teeth of the gear;

Fig. 6 is an end view of the contiguous portions of the tool and gear shown in Fig. 5;

Fig. 7 is a sectional view taken on line 7—7 of Fig. 5 showing the meshing point of the tool and gear midway between the end faces of both;

Fig. 8 is a view similar to Fig. 7 showing the application of the invention to chamfering internal gear teeth;

Figs. 9 and 10 are detail views showing a variation of the chamfering effect from that shown in the preceding figures.

Like reference characters designate the same parts wherever they occur in all the figures.

One character of the chamfering effect obtained by this invention is shown illustratively in Fig. 4 with reference to an involute gear W. The teeth $t$ of this gear have involute side faces $f$ which are chamfered at both sides of their outer ends so as to make beveled surfaces $c$ which diverge from the involute face curves toward the median radial lines of the teeth.

The tool T by which the chamfering action is performed is provided with oblique peripheral notches $n$ and intermediate teeth $d$ having the same circular pitch as the gears with which it is designed to be used. Such teeth are grooved or gashed, preferably completely through them, to form a plurality of cutting edges $e$ in their side faces extending in a general root to crest direction and spaced apart lengthwise of the teeth. These cutting edges perform a cutting action with removal of stock from the gear teeth when run in mesh with a work piece in such fashion that an endwise component of relative motion, or skid, occurs between the meshing teeth of tool and work. The sides of the tool teeth make an angle with the contiguous sides of adjacent teeth which is much wider than the angle between the opposite side faces of the teeth of standard gears, and the roots of adjacent tool teeth are closer together than the width of the circumferential faces of standard gear teeth. More generally stated, the pressure angle of the tool is greater than the pressure angle of the work piece. It follows from these characteristics that when a work piece having gear teeth or the like is placed in mesh with the tool, the corners of its teeth between their lateral and end faces are the only portions which come into immediate engagement with the tool.

In the tools shown in Figs. 1 to 3, the teeth meet at their roots, their sides are straight in planes perpendicular to the axis, and meet the sides of adjacent teeth at an angle of approximately 90°. These details are not essential, however, as later appears.

Tools capable of accomplishing the object of the invention without axial displacement are made with teeth and intermediate tooth spaces which extend at an oblique angle to the end faces of the tool and are of unequal width and depth. Such spaces, and consequently the teeth, are formed by a cutter, in this instance a grinding wheel G (shown in Fig. 3), which has a profile at its circumference complemental to the prescribed shapes of the spaces or notches $n$ and is passed across the circumference of the tool being made in a straight path which is inclined to the axis of the tool and in which the cutter is located so that its formed circumference intersects the circumference of the tool. The projections of the path in which the circumference of the cutter traverses the tool are shown at P—P in Figs. 2 and 3, and the projection of the tool axis is shown at Ta—Ta in Fig. 2. These projections in Fig. 2 cross at an angle N, which is here designated the skew angle of the spaces $n$ and tool teeth $d$. Owing to the fact that the path P—P is straight and oblique to the tool axis, it is at a greater distance from the axis of the tool at the points where it crosses the end faces than at any other point and is nearest to the axis in the mid plane of the tool. Hence the notches which it cuts are deepest and widest in the mid plane of the tool and shallowest and narrowest at the end faces, and of progressively increasing depth and width from each end face to the mid plane. Conversely, the teeth $d$ are narrowest in their mid length and widest at their ends.

This method of forming the tool teeth is very simple and the operation can be carried out with great speed and accuracy. It constitutes one of the phases of the invention for which protection is claimed herein. A cutter such as the grinding wheel G, or other suitable cutter when made to cut tooth spaces with straight sides and an included angle of 90°, or any other selected angle, is formed with bevels at the circumference which are straight in axial planes of the cutter and meet at an apex. Such a cutter can be formed and trued from time to time quickly and accurately.

In performing the chamfering operation with the aid of a tool such as has been described, the work gear and tool are placed in mesh in a skewed or crossed axis relationship, that is, oblique to one another. Although the axes of the tool and work piece do not intersect, yet their projections on a plane parallel to both axes intersect and it is the angle between such projections that is considered to be the crossed axis angle of the cutter and work. In Fig. 5, where the projection of the tool axis is shown at Ta—Ta and the projection of the work gear axis is shown at Wa—Wa, the crossed axis angle is indicated as S. The work gear W there shown is a helical gear of which the mean helix angle of its teeth is designated H. The algebraic sum of the angles S and N is equal to the angle H, and either or both of these angles can be varied in order to accommodate the tool to work gears of various helix angles within a wide range, including spur gears. For the purpose of this description a spur gear is considered as a helical gear of zero helix angle.

While the crossed axis angle S may be of any value within a wide range, it has been found that best results in the case of helical and spur gears may be obtained if it is of some value between 15° and 25°. With worms the angle should be substantially larger, in the order of 45°, more or less. When the angle S is established as of a suitable value, for operation on any given work piece, the angle N is then set at a value to complete the equation.

Having been thus placed in mesh, either the tool or the work gear is rotated about its axis, and the element thus rotated rotates the other by the action of their intermeshing teeth. Pressure is exerted on one or the other tending to bring them closer together. Due to the divergence of their respective paths of rotation, an endwise slip occurs between the meshing teeth, whereby the cutting edges in the sides of the tool teeth remove stock from the corners of the work gear teeth, the amount removed being dependent on the distance to which one element is advanced toward the other under pressure. Extreme amounts of stock removal are indicated in Figs. 4, 6, 7 and 8, where the chamfered surfaces are shown as meeting one another in the median helical lines of the teeth; and in Figs. 9 and 10, where the teeth are rounded at the ends, as well.

The formation of the tool teeth with varying widths, as previously described, causes them to envelop the crests of the gear teeth and make contact with them from end to end provided the face width of the tool (i. e., its axial length), is great enough to project beyond both end faces of the work gear in a given axial plane of the gear. This condition is illustrated in Fig. 5, wherein the end faces of the tool are shown as crossing the gear axis Wa—Wa outside of the end faces of the work gear. Under these conditions the tool produces a uniform chamfer along the entire length of the work gear teeth, or one which is nearly enough uniform for all practical purposes, without any endwise displacement of the tool or gear. Chamfering of gears can thus be accomplished very rapidly, often to a desired extent in a few seconds.

While the formation of the tooth spaces in the tool by straight line traverse of a cutter having beveled faces which are straight in profile is important and valuable from the point of view of ease, convenience and rapidity of forming the tool teeth and maintaining accuracy, yet departures from these particulars can be made within the scope of the invention. For instance, if it is desired to chamfer gears with other formations than a straight bevel, the grinding wheel or equivalent cutter can be formed with curved faces in profile, either convex or concave, whereby complemental forms are given to the tooth spaces of the tool, and if it is desired to chamfer the work gear teeth more deeply at the ends than at the middle, the cutter can be traversed across the tool, in forming the latter, in a path which is curved toward the axis of the cutter. Or, if it is desired to make the tool teeth narrower at the ends than at the middle, the cutter, whether having straight or curved bevels at its circumference, can be traversed across the tool in a curved path which is bowed outwardly from the axis of the tool. A tool formed in the manner last mentioned can be applied for chamfering internal gear teeth, as illustrated by Fig. 8.

It is often necessary or desirable to chamfer gear teeth and the like with removal of stock at the outer ends as well as at the outer corners so as to give the crests a rounded formation instead of leaving their outer faces flat or reducing them to sharp ridges; and also to eliminate burrs at the junctions of their sides with their outer faces, with or without rounding the crests. Figs. 9 and 10 show two teeth $d'$, $d'$, and the space between them, of a variant of the tool designed to remove stock in this way, in which the bottom of the space at $n'$ is concave with a continuous curvature and the sides are disposed to include an angle smaller than the included angle of the spaces shown in Figs. 1, 6, 7 and 8. Fig. 9 shows also one tooth $t'$ of a work piece as finished prior to chamfering and indicates by dotted lines the amount of stock to be removed and the final contours to be produced by chamfering. The same tooth is shown in Fig. 10 as being in full mesh with the tool.

The grinding wheel, or other cutter, employed to form such a chamfering tool has a profile at its circumference complemental to the prescribed profiles of the spaces and is applied in the same way as previously described. However, it should be noted that, in forming chamfering tools which are not long enough axially to overlap the entire axial length of the teeth or the like on which they will operate, the forming cutter, of whatever profile, is traversed across them in paths at a uniform distance from their axes, so that the teeth and spaces cut in the tools are of uniform width.

What I claim is:

1. The method of chamfering crests of gear teeth, which comprises providing a cylindrical tool having oblique teeth and tooth spaces in its circumference, the teeth of the tool being close together at their roots and their side faces being disposed at a wide angle to the side faces of adjacent teeth, the spaces between the tool teeth being narrow at each end and of progressively increasing width toward a point intermediate said ends, placing such tool in mesh with a gear to be chamfered in crossed axis relationship and in pressure contact, and rotating one of the elements constituted by the tool and gear.

2. The method of chamfering the crests of gear teeth, which comprises providing a cylindrical tool with oblique teeth and tooth spaces in its circumference, of which the spaces are widest and deepest at a location between the ends of the tool and are progressively narrower and shallower therefrom to both ends of the tool, and the teeth are correspondingly wider at both ends than at points intermediate their length, the contiguous side faces of adjacent teeth being disposed to form a wide included angle and approach one another substantially to an intersection at the roots of the teeth, placing such tool in mesh with a gear to be chamfered in crossed axis relationship, applying pressure between the tool and gear in a direction to crowd the gear teeth into the tooth spaces of the tool, and rotating one of the elements constituted by the tool and gear.

3. A gear chamfering tool comprising a cylindrical body having oblique teeth on its circumference provided with cutting edges in their flanks between their ends, such teeth being close together at their roots and the contiguous side faces of adjacent teeth being disposed to include a wide angle, said teeth being wide at each end and of progressively decreasing width toward a point intermediate said ends and said teeth enveloping the crests only of the gear teeth.

4. The method of making a chamfering tool which comprises forming tooth spaces and intermediate teeth in the circumference of a cylindrical blank by passing a cutter, having a cutting profile which is complemental to the profiles of the tooth spaces to be formed, obliquely across the circumference of the blank in a path so located that such cutting profile intersects the blank said path lying in a plane tangent to a circumference struck from the axis of the blank.

5. The method of making a chamfering tool which comprises providing a rotary cutting tool having cutting elements at its circumference arranged in a profile complemental to the prescribed form of interdental spaces to be cut in the chamfering tool, traversing such cutting tool in a path lying in a plane tangent to an arc struck from the axis of the chamfering tool and which path coincides with its plane while rotating it, and holding a chamfering tool blank in an oblique position with respect to such plane and path and in a location where its circumference intersects the path of a part of the cutting tool and is cut thereby during the passage of the cutting tool.

6. The method of forming a chamfering tool, which comprises passing a cutter having cutting points disposed in a ridge at its circumference across the circumference of a blank in a straight path which is inclined obliquely to the axis of the blank.

References Cited in the file of this patent

UNITED STATES PATENTS

| Number | Name | Date |
|---|---|---|
| 1,642,179 | Schur | Sept. 13, 1927 |
| 2,126,178 | Drummond | Aug. 9, 1938 |
| 2,157,981 | Drummond | May 9, 1939 |
| 2,228,967 | Miller | Jan. 14, 1941 |

FOREIGN PATENTS

| Number | Country | Date |
|---|---|---|
| 392,385 | Great Britain | Apr. 18, 1933 |